LOCKOUT ELECTRONIC LINE CIRCUIT

Filed Jan. 8, 1952

INVENTOR.
ROELOF MAARTEN MARIE OBERMAN
BY Hugh A Kirk

United States Patent Office 2,731,514

Patented Jan. 17, 1956

2,731,514

LOCKOUT ELECTRONIC LINE CIRCUIT

Roelof Maarten Marie Oberman, The Hague, Netherlands, assignor to De Staat der Nederlanden, Ten Deze Vertegenwoordigd Door de Directeur-Generaal der Posterijen, Telegrafie en Telefonie, The Hague, Netherlands Application January 8, 1952, Serial No. 265,455

17 Claims. (Cl. 179—18)

Figures 1, 2:
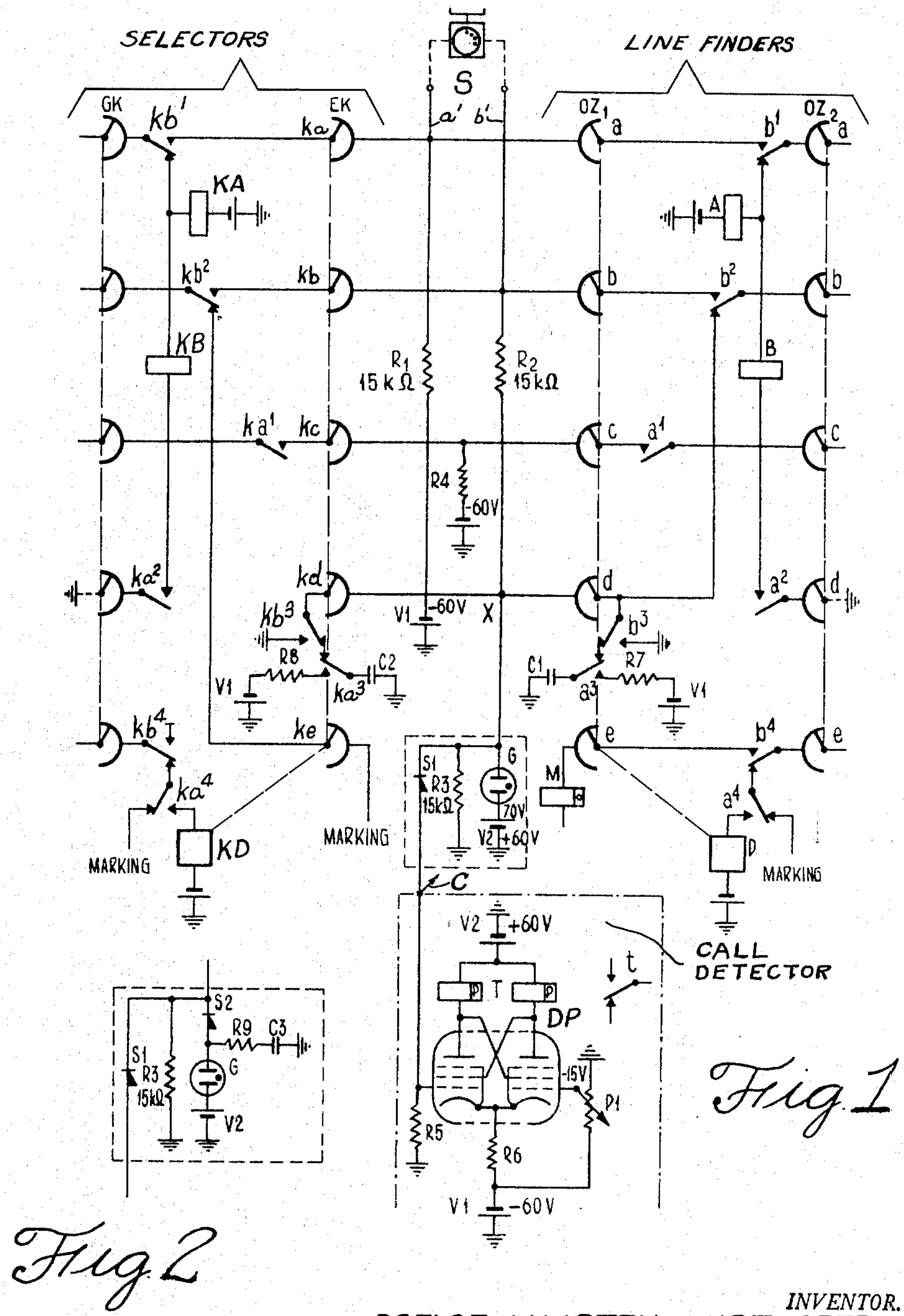

This invention relates to an improved electronic line circuit for exchanges of automatic switching systems, such as telecommunication signalling systems including telephone and telegraph systems. More particularly, it deals with a line circuit having a common electronic call detector for a plurality of subscriber lines in an exchange, which line circuit will automatically exclude faulty subscriber lines connected to it. Such faults include the continuation of a connection to a subscriber line after a call has been completed, which may occur either by a cable fault or short circuit in the subscriber line, or when a subscriber fails to restore the receiver of his telephone set to its hook.

Previously, line circuits of the relay type excluded a subscriber line when it showed such faulty operation, because in such circuits only the apparatus individually belonging to the subscriber line remained connected. However, in the case of electronic line circuits wherein a common electronic call detector is coupled to a plurality of subscriber lines, the continued connection or contact of one of said plurality of subscriber lines due to one of such faults, would maintain the electronic call detector energized and block it from responding to calls placed on any of the other of the plurality of said subscriber lines.

Accordingly, it is an object of this invention to produce a simple, efficient, effective and economic electronic line circuit having a common electronic call detector which has the ability of automatically excluding any and all of those subscriber lines connected to the electronic call detector, which lines remain connected or energized after their calling function has been completed.

Another object is to produce an electronic line circuit which has all the advantages of a line circuit of the relay type regarding its ability to exclude any line which erroneously maintains a closed connection.

Another object is to provide such an improved electronic line circuit which will not become blocked in the event that one of a plurality of subscriber lines connected to a common electronic call detector becomes erroneously and continuously connected after its calling function has been completed.

Another object is to provide an electronic line circuit which will automatically exclude those subscriber lines which remain connected due to the failure of a subscriber to restore the receiver of his apparatus to its hook.

Generally speaking, the line circuit of this invention comprises a pair of wires which connects a subscriber to an exchange in a telecommunication system, which wires not only are joined to the two speech wires of the switching system, but also to separate resistances and the opposite poles of a direct current (D. C.) voltage source, so that a complete circuit between said poles of said voltage source may be connected when the subscriber connected to those wires lifts the receiver of his telephone to make a call, or the receiver is left off its hook, or a short occurs in the wires between the exchange and the subscriber station. Connected to one of the wires is a tap or junction, which possesses a given calling voltage when the circuit through the two wires from one pole to the other of said direct current source is normally completed, and it is this calling voltage at this junction point which indicates that a subscriber desires to make a call. In an electronic line circuit a plurality of such junctions on the wires of separate subscribers may be connected through correspondingly separate rectifiers to a common electronic call detector circuit which responds to a calling voltage at any one of said junctions to which it is connected. Thus, when any one of the subscriber wires is connected the common call detector is put into operation.

The improvement in this circuit according to the present invention comprises connecting to said junction, or tapping point of the wire to which the call detector is connected, an electrical element, such as for example a gas-filled diode electron discharge tube, which is connected with a second direct current voltage source which supports or assists the voltage of the first mentioned direct current (D. C.) voltage source connected to the wires of the subscriber. Also connected to said junction there is an additional means, such as a condenser which discharges to supply a sufficient additional voltage to said junction immediately after a switching circuit has been disconnected through the corresponding subscriber line, to cause the electrical element to change from its normal stable condition of non-conductivity of the voltage from the second D. C. voltage source to a second stable condition of conductivity, such as by the firing of the gas-filled diode, so that said second voltage source will decrease the normal calling voltage at said junction to a level insufficient to operate the call detector or any of the switching circuits which automatically connect with that subscriber line. This electrical element may, however, still maintain a sufficient voltage to the subscriber line to permit signals to be sent to the subscriber, in the case he has left his receiver off the hook, to inform him of that faulty condition.

If desired, a time constant circuit means may be connected to the electrical element so that it will not respond to rapid impulses or breaks in the line, which may occur in the case the subscriber operates the dial of his telephone set to break the circuit, but will respond to a long continued break in the event the subscriber does restore his receiver to disconnect the line circuit to the gas-filled diode for a sufficient length of time to overcome the delay of the time constant circuit. Preferably, a rectifier is also included, if a condenser is employed in this time-constant circuit to speed its charging and delay its discharging.

The above mentioned and other features and objects of this invention and the manner of attaining them are given more specific disclosure in the following description of embodiments of the invention taken in conjunction with the accompanying drawing, wherein:

Fig. 1 is a schematic wiring diagram of an electronic line circuit in accordance with one embodiment of the present invention in a telephone exchange connected to one subscriber and showing those parts of the associated circuits of the exchange necessary to explain the operation of the line circuit; and Fig. 2 is a modified form of the false call excluding circuit portion of the circuit shown in Fig. 1.

I. *The line circuit*

Referring to Fig. 1 which is adapted for a telephone system, there is shown one subscriber station or set S which is connected by a pair of speech wires *a'* and *b'* which extend vertically and parallel through the center of the figure and are connected, respectively, with the *a* and *b* wires of the switching circuits in an exchange. To the right side of the wires *a'* and *b'* are shown the first and second line finders OZ1 and OZ2 for an outgoing call from subscriber S, and to the left side of the wires *a'* and *b'* are shown the final selector EK and group selector GK for an incoming call to the subscriber S.

Also connected with the wires *a'* and *b'* at the junctions with the *a* and *b* wires in the exchange, are connected two fixed resistances R1 and R2 (which, for example, may have a value of 15,000 ohms each). One of these resistances R1 is shown connected to the negative pole of a first D. C. voltage source, such as battery V1 of the automatic switching system; and the other resistance R2 is connected through a junction or tapping point X to a third resistance R3 (which also may be of 15,000 ohms, or similar in value to that of resistances R1 and R2), and thence to the other pole of the battery V1, namely ground. The junction X, between the resistances R2 and R3, also may be connected to the *d*-wire of the line circuit in the exchange, which *d*-wire is herein connected to one of the arcs of the first line finder switch OZ1 and may be used for testing the calling voltage of the subscriber line. For example, if voltage of the D. C. battery V1 is —60 volts and each of the resistances R1, R2 and R3 are of equal value, ⅓ of this voltage, namely —20 volts, will occur at the point X, when this subscriber line circuit is normally connected or completed.

When the subscriber station S is not being operated, the circuit between the poles of battery V1 through wires *a'* and *b'*, is disconnected and the point X is at ground potential, by its connection through resistance R3. On the closure of the subscriber loop or line by the taking up of the receiver in the subscriber set S, a negative potential is applied to the point X, which is used for signalling that the subscriber S wishes to make a call, and for detection by the line finder to determine which of a plurality of the subscriber lines is to be connected.

II. *The call detector*

Also connected to the junction X through a rectifier S1, there is connected a common call conductor C to a common call detector circuit, shown in the open bottomed dot-dash line rectangle in the central lower portion of Fig. 1. This call detector circuit is connected in multiple with a plurality of other subscriber lines similar to that described above, say for example about 100 other subscriber line circuits.

The call detector may comprise a double pentode electron discharge tube DP which is arranged in a trigger circuit. The anodes or outputs of the pair of trigger tubes DP may be, respectively, connected to opposing coils of a polarized relay T, which coils are then connected together to a positive pole of a D. C. voltage source V2. The cathodes of the tubes DP may be connected together via a cathode resistance R6 to the negative pole of a voltage source V1. The control grid of the left side of the tube DP may be connected between relatively high resistance R5 (for example about $10^6$ ohms) connected to ground, and the junction X through the common call conductor C and rectifier S1. The control grid of the right side of the double pentode DP may be connected to an adjustable rheostat or potentiometer P1, which potentiometer is connected between ground and the negative pole V1 of the voltage source. The adjustment of this potentiometer is such that it is less than the calling voltage which would be applied to the control grid from the point X, which for example may be —15 volts, i. e. 5 volts less than that normally at junction X (—20 volts). Thus, if no negative voltage is applied to the control grid of the left side of the tube DP, that is, if no subscriber line is connected to the call detector, the left side of the tube DP will remain conductive and energize its corresponding coil of the relay T to hold its armature *t* in the position shown in the drawing. However, as soon as a call is applied to one of the plurality (say one hundred) subscriber lines to which the call detector is connected, —20 volts from the corresponding junction X of said one subscriber line is connected through its rectifier S1 to the control grid of the left side of the tube DP, which is then more negative than the control of the grid of the right side of the tube, and therefore the right side of the tube becomes conductive, and the left side of the tube becomes non-conductive, energizing the other coil of the polarized relay T changing over the position of the armature *t*. By this change-over, a call has been signalized and responded to, and the operation of the switch of armature *t* may through a register circuit start a cord finder operating to find the particular subscriber line which desires connection. This part of the circuit, however, has not been disclosed in that it is conventional in telephone exchange systems. Furthermore, the particular call detector shown is also conventional and not a part of this invention.

III. *The line finder*

As soon as a cord finder (not shown in the drawing), which may be energized by a register (also not shown) is seized by the operation of the electronic call detector, the second line finder OZ2 is set into operation to find a corresponding free first line finder OZ1. As soon as this part of the switching is completed, an electronic detecting device in a register controls the connection of the *b*-wire of the second line finder circuit OZ2 through its wiper and back contact *b*2 to the *d*-wiper of the first line finder OZ1. Simultaneously, with this connection and finding the free first line finder OZ1, the relay A is energized so that the driving magnet D for the first line finder OZ1 is energized to start it wiping over its arcs of contacts in search of the calling voltage of subscriber S as communicated from the junction X to the *d*-wire. As soon as this junction X is found, the first line finder switch OZ1 stops rotating and the calling voltage is connected through the *d*-wiper of the first line finder OZ1 back through the *b*-wiper of the second line finder OZ2 to the register circuit, which then removes the ground from the *a*-wire of the second line finder, so that relay B is energized connecting the *a* and *b* wires of the line finders directly through contacts *b*1 and *b*2 and wires *a'* and *b'* to the subscriber circuit. The line circuit has thus been brought into speaking condition.

If desired, the *c*-wires of the exchange circuit may be connected through a resistance R4 to a voltage source for supplying a separate and different marking potential for each different subscriber, however, this feature is not a part of the present invention.

Connected to the *d*-wiper of the first line finder OZ1, there is also a series of contacts of a circuit in which a negative battery voltage (for example —60 volts) from battery V1 is applied through contact *a*3 and resistance R7 to charge a condenser C1, which circuit remains so connected as long as the relays A and B remain energized and a call is being transmitted through the line finder. However, as soon as the call has been completed and relays A and B are deenergized, the armatures *a*3 and *b*3 of this circuit take the positions shown in Fig. 1, so that the negative charge which has been placed on the condenser C1 is immediately conducted back through the *d*-wiper of the first line finder OZ1 to the junction X to perform a function which will be described later in chapter V below.

IV. *The final selector*

Similarly as for the line finder shown to the right of the two parallel subscriber line speaking wires *a'* and *b'*, there may be provided a circuit of the group and final selectors GK and EK, respectively, in the exchange. Thus, the wires *a'* and *b'* of the subscriber S may be seized by a final selector which circuit is connected substantially the same as that for the line finders described above, with the difference that the *b*-wire of this circuit is connected to the *ke*-wiper via a back contact *kb*2, instead of the *d*-wiper as shown for the line finder.

The *ke*-arc of contacts of the final selector EK may be connected to the numerical final selector control marking by means of which a register can position the final selector in the well known way in accordance with the desired tens and units digits of the number being called. The *c*-wire through the *kc*-wiper of the final selector EK may test the voltage at resistor R4, and if the line to S is free, the speech wires *ka* and *kb* under the control of the register may be directly connected through wires *a'* and *b'* to the subscriber S being called. At this time the contact *kb*3 in the final selector circuit EK connected to the *kd*-wire, similar to the circuit connected to the first line finder *d*-wiper mentioned above, connects ground potential to the junction X of the line circuit, so that the removal of the receiver by the subscriber S when being called does not instigate a call by applying a negative voltage to the junction X.

A circuit is also provided so that after the call is completed and relays KA and KB are deenergized, a negative potential from the condenser C2 (similar to condenser C1) will be applied to junction X through the back contacts *ka*3 and *kb*3 in their positions as shown in Fig. 1, in the event the subscriber S does not restore his receiver to its hook, or the circuit of wires *a'* and *b'* is not disconnected.

V. *False call excluding circuit*

In the case a call from a subscriber S proves to be faulty or a false one, that is, a subscriber S forgets to restore the receiver of his set to its hook or fails to dial or place a selecting signal on his line within a certain length of time, or if the wires *a'* and *b'* become shorted in their cable to the subscriber, a negative calling voltage (say, −20 volts) will be applied to the junction X which will operate the call detector and block it from responding to other subscribers connected to it through the common call conductor C. Such a false call due to a cable fault may include moisture penetration into the cable which decreases its resistance, or the cable may be cut through completely. If for example a cable of two hundred subscribers were cut, which subscribers correspond to different hundred groups so that the call detectors of numerous hundred groups would respond to such a cut, each call detector would then start a register, which in the case of a ten thousand line exchange having only one hundred call detectors, could substantially block and put out of order the whole exchange, if a circuit were not provided to exclude such false calls.

In order to prevent this blocking in the event that a faulty call appears on the line to subscriber S, an additional electrical element or means is connected to the junction X, which means herein is shown in the false call excluding circuit in the dash-line rectangles of Figs. 1 and 2. Herein this means includes, for example, a gas-filled diode tube G having one stable and normally non-conductive condition, connected to a second D. C. voltage source V2 (say, for example +60 volts), which may be the same as the voltage source V2 shown in the call detector connected to the anodes of the tube DP. This positive voltage connected to one electrode of the tube G in combination with a negative voltage from condenser C1 or C2 applied to the other electrode of the tube G1, will cause tube G to fire and change over to its other stable and conductive condition of passing current to short circuit or shunt out at least in part the effect of the resistance R3. The critical firing voltage or a threshold of the gas-filled tube G is greater than the normal calling voltage at the junction X, and less than the combined voltages from both D. C. voltage sources V1 and V2, say for example about 100 volts, which is less than the actual difference of 120 volts between the +60 volts from V2 and the −60 volts from discharge of condenser C1 or C2. Thus, as soon as the tube G fires after a call has been completed, the tube G will remain conductive as long as the circuit is connected or completed from the voltage source V2 through the wires *a'* and *b'* to the voltage source V1. However, the operating voltage of the gas filled tube G is such that it decreases the normal calling voltage at the junction X below the critical operating voltage of the call detector. Say for example, the tube G has an operating voltage of 70 volts so that 70 less 60 or only −10 volts then is present at the junction X when the tube G is conductive. This is less than the −15 volts bias on the right side trigger tube DP of the call conductor, so that no change-over of the call detector can occur until a negative voltage greater than −15 volts can be applied to the left side trigger tube DP from the junction X. The conductivity of the tube G nevertheless keeps a complete circuit connected through the subscriber set S and its wires *a'* and *b'*.

This decreased voltage at the junction X is also sufficiently small that a line finder seeking for a calling voltage or another subscriber line passes over this decreased voltage without responding or being affected by it.

In connection with the present invention the system described in Oberman Patent No. 2,574,224 issued November 6, 1951, for "Circuit for Marking a Line as Busy" may be also employed and connected to the *c*-wire of the present circuit, so that when a subscriber line has been excluded by the operation of the false call excluding circuit of this invention, that subscriber line circuit will be indicated to be occupied for incoming calls. Or, a test over the *b*-wire of the final selector EK could indicate a different voltage at its connection with the wire *b'* when the false call excluding circuit is connected, which also may give an indication that that subscriber line is busy or that it is in faulty operation.

As soon as the above traced circuit to the tube G is broken, such as by the restoring of the receiver to its hook at the set S or by the correction of the short in the wires *a'* and *b'*, the diode G will be discharged because its circuit also will have been broken.

VI. *Modifications*

In order to prevent the false call excluding circuit from being disconnected in the event the subscriber may operate the dial of his telephone set, so as to interrupt the circuit through diode G only for a short time and thereby erroneously discharge diode G, a time-constant circuit such as the resistance R9 and condenser C3 shown in the modified form of the false call excluding circuit in Fig. 2 may be inserted for the dash-line rectangle false call excluding circuit shown in Fig. 1. This time-constant circuit may be constructed so that in order for the diode G to discharge, an interruption must occur in the circuit which is of a duration considerably longer than the duration of a dialing pulse. Thus tube G would remain energized and conductive until a sufficiently long interruption in the circuit of wires *a'* and *b'* would occur so that the condenser C3 could completely discharge. Furthermore, in order to prevent too quick a discharge of condenser C3 through the resistance R3 and to permit rapid charging of said condenser C3, a rectifier S2 may be placed in series with the tube G.

If desired, the circuit including the condensers C1 and/or C2 may be connected with the *b* and/or *kb*-wires instead of the *d* and *kd*-wires as shown, without departing from the scope of this invention, so long as the proper voltage is applied to the other or remote electrode of the diode G to make it conductive under the conditions of faulty operation of the subscriber line comprising wires *a'* and *b'*.

To aid in correcting one type of false calls, a busy tone may be transmitted to the subscriber set S through the conducting diode G, so as to signal the subscriber that he has forgotten to put his receiver on its hook.

Instead of connecting a negative voltage to the first voltage source V1 to wire *a'* and a positive or ground voltage to wire *b'*, as shown in the drawing, the poles of the batteries may be reversed without departing from the principle of this invention. In this event, however, the voltage at the junction X would correspondingly be different and the testing voltage therefor must be adjusted accordingly. Also the electrodes of the diode G may have to be reversed.

Although specific voltages have been described above to illustrate the operation of this invention, it is obvious that the principle of this invention may be carried out with other voltages and by other electrical means than the diode G, which means would have two stable conditions. In fact, if desired, the junction X may be maintained at ground potential when the false call excluding circuit is in operation by connecting a suitable resistance to the positive voltage of the battery V2. The important point being that the voltage at the junction X is below the critical voltage for operating the call detector, when a faulty condition occurs on the line to a subscriber S.

While there is described above the principle of this invention in connection with specific apparatus, it is to be clearly understood that this description is made only by way of example and not as a limitation to the scope of this invention.

What is claimed is:

1. A subscriber line circuit to an exchange of a telecommunication system, comprising: a subscriber's set, a pair of wires, resistances in series with said wires, a voltage source having its opposite poles connected in series through said pairs of wires and said resistances, a junction between said resistances in said line circuit of said wires, a call detector connected to said junction and common to a plurality of subscriber's line circuits, an electrical element connected to said junction, and means connected to said junction for operating said electrical element to prevent the reoperation of said call detector after a call has been completed over said subscriber line circuit and said line circuit remains connected between said poles.

2. A circuit according to claim 1 wherein said electrical element includes a gas filled diode and said voltage source is a direct current source.

3. A circuit according to claim 1 wherein said means comprises a condenser connected to discharge into said subscriber line circuit.

4. A circuit according to claim 1 wherein said electrical element includes a time-constant circuit for preventing the response of said element to short disconnections of said subscriber line.

5. A line circuit for a telecommunication exchange having a plurality of subscriber lines, each line comprising: two wires, a subscriber's set, at least a pair of resistances, a voltage source, said two wires being connected in series from one pole of said voltage source through said subscriber's set and said pair of resistances to the other pole of said voltage source, said pair of resistances having a junction in said line circuit between them, an electrical element connected to said junction for shunting one of said resistances to reduce the voltage in said line at said junction, an electronic call detector common to a plurality of said lines and connected to said lines at their said junctions, and means to energize said electrical element upon the release of an exchange circuit from said line, whereby the voltage at said junction is maintained insufficient to operate said call detector until said line circuit is disconnected to thereby deenergize said electrical element.

6. A circuit according to claim 5 wherein said electrical element has two stable conditions of operation, one being a conductive condition and the other being a non-conductive condition.

7. A circuit according to claim 5 wherein said electrical element comprises a gas-filled diode and said voltage source is a direct current source.

8. A circuit according to claim 7 wherein said means responsive to the release of an exchange includes a condenser which fires said gas-filled diode.

9. In an exchange for telecommunication having an electronic line circuit connected to the two speech wires of a subscriber line, said electronic line circuit comprising: a first direct current voltage source, a pair of resistances, one connected to each of said two speech wires in series with opposite poles of said first direct current voltage source, a rectifier connected from one of said wires to an electronic call detector common to a plurality of said subscriber lines, the improvement comprising: an electrical element having two stable conditions, a junction between said resistances for connection to said electrical element, and a second direct current voltage source connected to said junction for supplying a voltage to assist said first direct current voltage source to operate said electrical element to prevent the operation of said call detector when said subscriber's line has not been disconnected after completion of a call.

10. A circuit according to claim 9 wherein said electrical element comprises a gas-filled diode.

11. In an electronic line circuit for an exchange of a telecommunication system having line finders, selectors, and subscriber lines, each having two wires connected in series from one pole of a first direct current voltage source through resistances and a subscriber station to the other pole of said first source, a junction in each said line between said resistances, a rectifier connected to each said junction, a call detector common to a plurality of said lines connected to said rectifier, said call detector being responsive to a given voltage at said junction when said subscriber station is operated, to close said line circuit, and means to connect a line finder to said line at said junction when said subscriber seeks to make a call, the improvement comprising: an electrical element having two stable conditions which is also connected to said junction, and a second voltage source connected to said element to change its condition when connected to said first voltage source, whereby said element supplies a voltage to said junction insufficient to operate said call detector and said means to connect a line finder so that if said subscriber leaves his station operated it will not block all of said plurality of said subscriber lines connected to said common call detector.

12. A circuit according to claim 11 wherein said call detector comprises a trigger circuit.

13. A circuit according to claim 11 wherein said electrical element comprises a gas-filled diode and said second voltage source assists the voltage from said first voltage source.

14. A circuit according to claim 11 including means for operating said electrical element after a call through said subscriber line has been completed and said subscriber line remains connected.

15. A circuit according to claim 14 wherein said means for operating said electrical element includes a condenser which is connected to said electrical element after a call to a subscriber line has been completed.

16. A circuit according to claim 11 wherein said electrical element includes a time-constant circuit and a rectifier for preventing the response of said electrical element to short interruptions in a connected subscriber line circuit.

17. A circuit according to claim 16 wherein said time-constant circuit includes a capacitance and a resistance, and wherein said rectifier is connected to accelerate the charging of said capacitance.

References Cited in the file of this patent

UNITED STATES PATENTS 2,183,656 Ostline ---------------- Dec. 19, 1939